(12) United States Patent
Gilstad et al.

(10) Patent No.: US 8,567,754 B1
(45) Date of Patent: Oct. 29, 2013

(54) TUNABLE VALVE ASSEMBLY

(71) Applicants: Dennis W. Gilstad, San Antonio, TX (US); Barbara C. Gilstad, San Antonio, TX (US)

(72) Inventors: Dennis W. Gilstad, San Antonio, TX (US); Barbara C. Gilstad, San Antonio, TX (US)

(*) Notice: Subject to any disclaimer, the term of this patent is extended or adjusted under 35 U.S.C. 154(b) by 0 days.

(21) Appl. No.: 13/937,289

(22) Filed: Jul. 9, 2013

Related U.S. Application Data (63) Continuation-in-part of application No. 13/730,868, filed on Dec. 29, 2012, now Pat. No. 8,496,224, and a continuation-in-part of application No. 13/711,644, filed on Dec. 12, 2012, and a continuation-in-part of application No. 13/616,098, filed on Sep. 14, 2012, now Pat. No. 8,403,337, and a continuation-in-part of application No. 13/525,391, filed on Jun. 18, 2012, now Pat. No. 8,292,301, and a continuation-in-part of application No. 13/456,235, filed on Apr. 26, 2012, now Pat. No. 8,276,918, and a continuation-in-part of application No. 13/184,965, filed on Jul. 18, 2011, now Pat. No. 8,210,542.

(51) Int. Cl.
*F16K 31/00* (2006.01)

(52) U.S. Cl.
USPC ............ 251/64; 251/334; 251/80; 251/318; 251/12; 251/367; 137/516.29; 137/902

(58) Field of Classification Search
USPC ........... 251/332–334, 366–367, 356–358, 12, 251/48, 77, 80, 120, 64; 137/516.29, 902
See application file for complete search history.

(56) References Cited

U.S. PATENT DOCUMENTS

| | | |
|---|---|---|
| 767,118 A | 8/1904 | Popham et al. |
| 829,546 A | 8/1906 | Schou |
| 1,705,800 A | 3/1929 | Akeyson |
| 1,716,896 A | 6/1929 | Miller |
| 1,733,180 A | 10/1929 | Biedermann |
| 2,002,672 A | 5/1935 | Melott |
| 2,011,547 A | 8/1935 | Campbell |
| 2,018,288 A | 10/1935 | Steirly |
| 2,178,876 A | 11/1939 | MacClatchie |
| 2,298,632 A | 10/1942 | Thorner |
| 2,329,576 A | 9/1943 | Anderson |
| 2,446,196 A | 8/1948 | Sitney |
| 2,792,016 A * | 5/1957 | Shellman et al. ........ 137/516.29 |

(Continued)

OTHER PUBLICATIONS

Introduction to Impulse Hammers, Internet download Sep. 2011 from Dytran Instruments, Inc.

*Primary Examiner* — John K Fristoe, Jr.
*Assistant Examiner* — Marina Tietjen
(74) *Attorney, Agent, or Firm* — Dennis W. Gilstad (57) ABSTRACT

Tunable valve assemblies attenuate valve-generated vibration at one or more predetermined assembly resonant frequencies which are typically altered to correspond to specific pump housing resonant frequencies. Each tunable valve assembly comprises a valve body having a peripheral groove spaced radially apart from a central reservoir. An adjustable flange may be coupled to the valve body for imposing a predetermined shear preload by partially constraining a viscoelastic element in the reservoir. One or more valve assembly resonant frequencies are thus predictably altered. Further, the associated valve-generated vibration spectrum is narrowed, and its amplitude is reduced through hysteresis loss of closing impulse energy at each predetermined assembly resonant frequency. Assembly resonant frequencies are additionally or alternatively altered through choice of viscoelastic elements and inclusions (e.g., shear-thickening materials) in the reservoir and/or peripheral groove. Peripheral groove fenestrations increase valve assembly responsiveness to longitudinal compressive force while stabilizing peripheral groove elements.

14 Claims, 7 Drawing Sheets

(56) References Cited

U.S. PATENT DOCUMENTS

| | | | |
|---|---|---|---|
| 3,004,633 A | | 10/1961 | Hobson |
| 3,047,007 A | * | 7/1962 | Lunken .................. 137/315.21 |
| 3,053,500 A | | 9/1962 | Atkinson |
| 3,053,501 A | | 9/1962 | Varga |
| 3,054,422 A | | 9/1962 | Napolitano |
| 3,172,424 A | * | 3/1965 | Stillwagon ................ 137/527.4 |
| 3,540,472 A | | 11/1970 | Brady et al. |
| 3,617,589 A | | 11/1971 | Jones-Hinton et al. |
| 3,827,671 A | * | 8/1974 | Bolden et al. .................... 251/84 |
| 3,951,849 A | | 4/1976 | Vickery et al. |
| 4,088,301 A | | 5/1978 | Ehmig |
| 4,103,909 A | | 8/1978 | Hoffman et al. |
| 4,181,027 A | | 1/1980 | Talbott, Jr. |
| 4,254,792 A | | 3/1981 | Schadel |
| 4,269,419 A | | 5/1981 | Brant |
| 4,300,775 A | | 11/1981 | Ringel |
| 4,572,519 A | | 2/1986 | Cameron et al. |
| 4,602,762 A | * | 7/1986 | Koch et al. .................... 251/174 |
| 4,687,421 A | | 8/1987 | Cameron et al. |
| 4,759,428 A | | 7/1988 | Seshimo |
| 4,852,533 A | | 8/1989 | Doncker et al. |
| 4,860,995 A | | 8/1989 | Rogers |
| 4,951,707 A | | 8/1990 | Johnson |
| 5,073,096 A | | 12/1991 | King et al. |
| 5,088,521 A | | 2/1992 | Johnson |
| 5,091,455 A | | 2/1992 | Blank et al. |
| 5,158,162 A | | 10/1992 | Fink et al. |
| 5,183,863 A | | 2/1993 | Nakamura et al. |
| 5,226,445 A | | 7/1993 | Surjaatmadja |
| 5,238,744 A | | 8/1993 | Williams et al. |
| 5,249,600 A | | 10/1993 | Blume |
| 5,262,232 A | | 11/1993 | Wilfong et al. |
| 5,275,204 A | | 1/1994 | Rogers et al. |
| 5,370,150 A | | 12/1994 | Nehm |
| 5,431,186 A | | 7/1995 | Blume |
| 5,580,068 A | | 12/1996 | Gundy |
| 5,629,503 A | | 5/1997 | Thomasen |
| 5,639,098 A | | 6/1997 | MacDonald |
| 5,670,006 A | | 9/1997 | Wilfong et al. |
| 5,799,953 A | | 9/1998 | Henderson |
| 5,979,242 A | | 11/1999 | Hobbs |
| 6,000,677 A | | 12/1999 | Cook et al. |
| 6,026,776 A | | 2/2000 | Winberg |
| 6,056,270 A | | 5/2000 | Zimmerly |
| 6,290,205 B1 | | 9/2001 | Haga et al. |
| 6,331,578 B1 | | 12/2001 | Turner et al. |
| 6,432,320 B1 | | 8/2002 | Bonsignore et al. |
| 6,701,529 B1 | | 3/2004 | Rhoades et al. |
| 6,713,438 B1 | | 3/2004 | Baillargeon et al. |
| 6,959,727 B2 | | 11/2005 | Krishnamoorthy et al. |
| 7,081,223 B2 | | 7/2006 | Khoury |
| 7,222,837 B1 | | 5/2007 | Blume |
| 7,287,545 B2 | | 10/2007 | Zelson |
| 7,429,220 B2 | | 9/2008 | Kuntimaddi et al. |
| 7,513,483 B1 | | 4/2009 | Blume |
| 7,513,759 B1 | | 4/2009 | Blume |
| 7,591,450 B1 | | 9/2009 | Blume |
| 7,608,314 B2 | | 10/2009 | Plant |
| 7,794,827 B2 | | 9/2010 | Palmer et al. |
| 7,847,057 B2 | | 12/2010 | Muller et al. |
| 7,942,603 B2 | | 5/2011 | Miller |
| 2004/0226616 A1 | | 11/2004 | Vicars |
| 2005/0084229 A1 | | 4/2005 | Babbitt et al. |
| 2005/0206096 A1 | | 9/2005 | Browne et al. |
| 2007/0025811 A1 | | 2/2007 | Wilhelm |
| 2007/0138423 A1 | | 6/2007 | Smith |
| 2008/0279706 A1 | * | 11/2008 | Gambier et al. .............. 417/455 |
| 2010/0327208 A1 | * | 12/2010 | Doutt ............................ 251/333 |
| 2011/0240064 A1 | | 10/2011 | Wales et al. |
| 2012/0035309 A1 | | 2/2012 | Zhu et al. |

* cited by examiner

TUNABLE VALVE ASSEMBLY

FIELD OF THE INVENTION

The invention relates generally to reciprocating high-pressure pumps, and more specifically to the valves of such pumps.

BACKGROUND

Reciprocating high-pressure pumps (commonly called frac pumps) are often used in oil and gas fields for hydraulic fracturing of rock formations to increase hydrocarbon yields. Such pumps are often truck-mounted for easy relocation from well-to-well. And they are usually designed in two sections: the (proximal) power section (herein "power end") and the (distal) fluid section (herein "fluid end"). Each pump fluid end comprises at least one (and typically three or more) subassemblies, with each subassembly comprising a portion of (or substantially the entirety of) a pump fluid end subassembly housing (shortened herein to "pump housing").

For each pump fluid end subassembly, its pump housing comprises a pumping chamber in fluid communication with a suction bore, a discharge bore, and a piston/plunger bore. A suction valve (i.e., a check valve) within the suction bore, together with a discharge valve (i.e., another check valve) within the discharge bore, control bulk fluid movement from suction bore to discharge bore via the pumping chamber. Pulsatile fluid flow through the pump results from periodic pressurization of the pumping chamber by a reciprocating plunger or piston within the piston/plunger bore. The resulting suction and pressure strokes alternately produce wide pressure swings in the pumping chamber (and across the suction and discharge valves) as the reciprocating plunger or piston is driven by the pump power end.

Such pumps are operated at peak pumped-fluid pressures in current practice up to about 15,000 psi, while simultaneously being weight-limited due to the carrying capacity of the trucks on which they are mounted. See, e.g., U.S. Pat. No. 7,513,759 B1, incorporated by reference.

Due to high peak pumped-fluid pressures, suction valves experience particularly wide pressure variations between a suction stroke, when the valve opens, and a pressure stroke, when the valve closes. For example, during a pressure stroke a valve body may be driven longitudinally toward contact with its corresponding valve seat with total valve closing force that may vary from about 50,000 to over 150,000 pounds (depending on pumped-fluid pressure and valve body transverse area). Valve-closure impact energy, in the form of a short-duration high-amplitude valve-closure impulse, is thus applied longitudinally to the proximal surfaces of the valve. Since little of this energy is dissipated in a conventional valve, it is necessarily transmitted (in the form of vibration) to the pump housing via the valve seat. As described below, the valve's vibration-generation effect is analogous to striking the valve seat repeatedly with an impulse hammer.

A valve-closure impulse is particularly prominent when it occurs as a conventionally-stiff valve body contacts a conventional frusto-conical valve seat. The valve body's longitudinal movement typically stops abruptly, together with the associated longitudinal movement of a proximal mass of pressurized fluid in contact with the valve body. The kinetic energy of the moving valve body and pressurized fluid is thus nearly instantly converted to a high-amplitude valve-closure impulse of short duration. The effect may be compared to that of a commercially-available impulse hammer configured to produce broad-spectrum high-frequency excitation (i.e., vibration) in an object struck by the hammer.

Thus, broad-spectrum high-frequency vibration predictably results from the high-energy valve-closure impulse characteristically experienced by a conventionally-stiff valve body contacting a conventional frusto-conical valve seat. This vibration is quickly transmitted via the valve seat, especially to proximate areas of the pump housing where it can be expected to excite damaging resonances that predispose the housing to fatigue failures. See, e.g., U.S. Pat. No. 5,979,242, incorporated by reference. Frac pump maintenance costs are well-known in the well service industry to be relatively high and growing, due to both rapid valve wear and the early emergence of structurally significant cracks suggestive of corrosion fatigue in the pump housing (particularly near the suction valve seat).

Proposed valve designs in the past have included relatively lighter valve bodies comprising lighter materials and/or one or more interior cavities. See, e.g., U.S. Pat. No. 7,222,837 B1, incorporated by reference. Notwithstanding the somewhat lower valve-closure impulse amplitudes theoretically associated with such lighter valve bodies, they have been less popular than heavier and substantially more rigid valve bodies. The latter valve bodies have historically been shown to be relatively durable, but that performance record was largely created in lower pressure applications where the vibration fatigue issues described above are less prominent.

The recent transition period from lower pressure pump applications to higher pressure applications generally might be compared to the transition from slow-turning two-cylinder automobile engines to higher-speed and higher-powered inline six-cylinder engines around the years 1903-1910. New engine failure modes became evident, though they were neither anticipated nor understood at the time. Whereas the earlier engines had been under-powered but relatively reliable, torsional crankshaft vibrations in the six-cylinder engines caused objectionable noise ("octaves of chatter from the quivering crankshaft") and unexpected catastrophic failures (e.g., broken crankshafts). (Quotation cited on p. 13 of *Royce and the Vibration Damper*, Rolls-Royce Heritage Trust, 2003). The vibration problems, though never entirely eliminated, were finally reduced to manageable levels after several crankshaft redesigns and the development of crankshaft vibration dampers by Royce and Lanchester.

Analogously, new valve designs are needed now for reducing failures associated with valve-generated vibration. Repeatedly-applied valve-closure energy impulses must be modified to reduce the excitation of destructive vibration resonances in valves, pump housings, and related structures.

SUMMARY OF THE INVENTION

Tunable valve assemblies meet the above need by attenuating valve-generated vibration at one or more predetermined assembly resonant frequencies. Attenuation is accomplished in part by altering (that is, "tuning") the assembly resonant frequencies to predetermined values corresponding to measured or estimated pump housing resonant frequencies (critical frequencies). Tunable valve assemblies then absorb, convert and redistribute (i.e., dissipate) a portion of valve-closure energy at these critical frequencies, meaning that only attenuated critical frequency vibration is then available for transmission to the pump housing. The remaining valve-closure energy is dissipated as heat as described herein.

The resulting targeted vibration attenuation is particularly beneficial because it minimizes vibration energy transmitted from valve to pump housing near the pump housing's critical frequencies. Vibration of pump housings at such frequencies is best minimized for the same reason that soldiers break step when they march over a bridge—because even relatively small amounts of vibration energy applied at the bridge's resonant frequency can cause catastrophic bridge failure.

To minimize analogous catastrophic pump housing failures, each tunable valve assembly of the invention is designed to attenuate valve-generated vibration through its capacity to dissipate as heat (e.g., via hysteresis and/or fluid turbulence) a portion of valve-closure energy at predetermined (pump housing) resonant frequencies. To that end, each tunable valve assembly is combined with a valve seat to form a tunable (suction or discharge) valve for installation in a pump housing.

Within each tunable valve, a tunable valve assembly comprises a valve body having a peripheral groove spaced radially apart from a central reservoir. Viscoelastic elements are disposed in the groove and reservoir, and the assembly resonant frequency of each such disposed viscoelastic element is affected by the viscoelastic material(s) used, as well as by constraints due to adjacent structures and/or by the choice of a variety of viscoelastic element inclusions. Examples of such viscoelastic element inclusions are reinforcing fibers, circumferential and/or central cavities within the viscoelastic element, and distributions of special-purpose materials (e.g., shear-thickening materials) within or in association with one or more viscoelastic elements.

As noted above, constraints on viscoelastic elements due to adjacent structures can alter valve assembly resonant frequencies. Examples of such effects are seen in embodiments comprising an adjustable flange coupled to the valve body for imposing a predetermined shear preload by further constraining a viscoelastic element already partially constrained in the reservoir. One or more valve assembly resonant frequencies may thus be predictably altered. Further, the associated valve-generated vibration spectrum is narrowed, and its amplitude is reduced through hysteresis loss of valve-closure impulse energy at each predetermined assembly resonant frequency (e.g., by conversion of valve-closure impulse energy to heat, rather than vibration).

Another control mechanism for alteration of assembly resonant frequencies would be through addition of composite elements to the viscoelastic reservoir element and/or to the viscoelastic peripheral groove element. Further, peripheral groove fenestrations, when present, increase valve assembly responsiveness to longitudinal compressive force while stabilizing viscoelastic and/or composite peripheral groove elements. Such responsiveness includes, but is not limited to, variations in the width of the peripheral groove which facilitate "tuning" of the groove together with its viscoelastic element.

Briefly summarizing, each embodiment of a tunable valve assembly attenuates valve-generated vibration transmitted to a pump housing in which the assembly is installed. The transmitted vibration spectrum is narrowed and its amplitude reduced through conversion and dissipation of valve-closure impulse energy as heat. One or more valve assembly structural features are tunable to at least one predetermined assembly resonant frequency to facilitate such impulse energy absorption, conversion and redistribution.

Continuing in greater detail, valve-closure impulse energy conversion in a tunable valve assembly primarily arises from hysteresis loss (e.g., heat loss) in the viscoelastic groove and/or reservoir elements, but may also occur in other portions of the tunable valve assembly (e.g., in the valve body itself). Hysteresis loss in a particular valve assembly structural feature is related in-part to that feature's compliance (i.e., the feature's structural distortion as a function of applied force).

Each tunable structural feature of a tunable valve assembly comprises at least one compliant portion of the valve body, together with an associated viscoelastic element. Each compliant valve body portion distorts substantially elastically under the influence of a closing energy impulse, and its associated viscoelastic element simultaneously experiences shear stress in accommodating the distortion. The resulting viscoelastic shear strain, however, is at least partially time-delayed. And the time delay introduces a phase-shift useful in damping valve-generated vibration (i.e., reducing its amplitude).

In addition to vibration damping, a complementary function of a tunable valve assembly is narrowing of the spectrum of valve-generated vibration. Spectrum narrowing occurs as a tunable valve assembly exhibits compliance in the form of deformation over time in response to an applied force. Since each instance of compliance takes place over a finite time interval, the duration of a closing energy impulse is effectively increased (and the vibration spectrum correspondingly narrowed) as a function of the overall compliance of a tunable valve assembly.

A narrowed valve-generated vibration spectrum, in turn, is less likely to generate destructive sympathetic vibration in adjacent regions of a pump housing. For this reason, compliant portions of a valve body are designed to elastically distort under the influence of the closing energy impulse (in contrast to earlier substantially-rigid valve designs). Compliance-related distortions are prominent in, but not limited to, the shapes of both the (peripheral) groove and the (relatively central) reservoir. Viscoelastic elements in the groove and reservoir resist (and therefore slow) the distortions, thus tending to beneficially increase the closing energy impulse's duration while narrowing the corresponding vibration spectrum.

Groove and reservoir viscoelastic element distortions both result in viscoelastic stress and its associated time-dependent strain. But the mechanisms underlying the distortions differ. In a peripheral groove, for example, proximal and distal groove walls respond differently to longitudinal compressive force on the tunable valve assembly. They generally move out-of-phase longitudinally, thereby imposing time-varying compressive loads on the groove viscoelastic element. Thus the shape of the groove (and the overall compliance of the groove and its viscoelastic element) changes with time, making the groove as a whole responsive to longitudinal force on the assembly.

To further increase groove responsiveness to longitudinal force, the groove wall may be fenestrated as schematically illustrated herein. Groove responsiveness is increased in this manner by changing the coupling of the proximal groove wall to the remainder of the tunable valve assembly (see Detailed Description herein).

In the reservoir, in contrast, an adjustable preload flange may be centrally coupled to the valve body for imposing a shear preload on the viscoelastic reservoir element (i.e., shear in addition to that imposed by the reservoir itself and/or by the closing energy impulse acting on the viscoelastic element via the pumped fluid). The amount of shear preload varies with the (adjustable) radial and longitudinal positions of the flange within the reservoir. The overall compliance and resonances of the reservoir and its viscoelastic element may be predictably altered by such a shear preload, which is imposed by the flange's partial constraint of the viscoelastic reservoir element. Note that reservoir and groove viscoelastic elements may in certain embodiments be coupled by a plurality of viscoelastic fenestration elements lying in groove wall fenestrations, thus allowing transmission of shear stress between the groove and reservoir viscoelastic elements.

In certain tunable valve assembly embodiments, at least a first predetermined assembly resonant frequency may be achieved through adjustment of shear preload on the reservoir viscoelastic element, and at least a second predetermined assembly resonant frequency may be achieved through choice of the groove viscoelastic element.

Note that any structural feature of a tunable valve assembly (e.g., a valve body or a viscoelastic element) may be supplemented with one or more reinforcement components to form a composite feature. Reinforcement materials tend to alter compliance and may comprise, for example, a flexible fibrous material (e.g., carbon nanotubes), a shear-thickening material, and/or other materials as described herein.

As noted above, alterations in compliance (with its associated hysteresis loss) contribute to predetermined vibration spectrum narrowing. Such compliance changes (i.e., changes in displacement as a function of force) may be achieved through adjustment of constraint. Constraint, in turn, may be achieved, e.g., via compression applied substantially longitudinally by the adjustable preload flange to a constrained area of the viscoelastic reservoir element. In embodiments comprising a central longitudinal guide stem, the constrained area may be annular. And adjacent to such an annular constrained area may be another annular area of the viscoelastic reservoir element which is not in contact with the adjustable preload flange (i.e., an annular unconstrained area). This annular unconstrained area is typically open to pumped fluid pressure.

As shown by the schematic illustrations herein, preload flange adjustment changes compressive restraint applied to the annular area of the viscoelastic reservoir element adjacent to the preload flange. The result is substantially countercurrent viscoelastic strain (i.e., movement in shear) relative to the annular unconstrained area. Valve-closure impulse energy lost (i.e., redistributed or dissipated as heat) in connection with the resulting shear strain in the viscoelastic element is subtracted from the total closing impulse energy otherwise available to excite destructive vibration resonances in the tunable valve assembly, valve seat and/or pump housing. See, e.g., U.S. Pat. No. 5,158,162, incorporated by reference. Note that in viscoelastic and shear-thickening materials, the relationship between stress and strain (and thus the effect of material constraint on resonant frequency) is generally time-dependent and non-linear. So a desired degree of non-linearity in "tuning" may be predetermined by appropriate choice of viscoelastic and shear-thickening materials in a tunable valve assembly or tunable valve.

Preload flange adjustment may change the longitudinal compliance of the tunable valve assembly by changing the effective radius and/or the longitudinal position of the flange as it constrains the viscoelastic reservoir element. This allows tuning of the valve assembly to a first assembly resonant frequency for maximizing hysteresis loss. Stated another way, by constraining a vibrating structure (i.e., an area of the viscoelastic reservoir element) with the flange, it is possible to force the vibrational energy into different modes. See, e.g., U.S. Pat. No. 4,181,027, incorporated by reference.

The invention thus includes means for constraining one or more areas of a viscoelastic element. And such constraint may be substantially constant or time-varying, with correspondingly different effects on resonant frequencies. Peripherally, time-varying constraint may be provided by out-of-phase movement of peripheral groove walls. While centrally, time-varying constraint may be provided by a flange as it is adjusted radially and/or longitudinally to change compressive force on an annular constrained area.

Flange radial adjustment is facilitated, e.g., via a choice among effective flange radii and/or flange periphery configurations (e.g., cylindrical or non-cylindrical). Flange longitudinal movement may be adjusted, for example, by (1) use of mechanical screws or springs, (2) actuation via pneumatic, hydraulic or electrostrictive transducers, or (3) heat-mediated expansion or contraction. Flange longitudinal movement may thus be designed to be responsive to operational pump parameters such as temperature, acceleration, or pressure. Since pump housing resonant frequencies may also respond to such parameters, tunable valve assemblies and tunable valves may be made at least partially self-adjusting (i.e., operationally adaptive or auto-adjusting) so as to change their energy-absorbing and spectrum-narrowing characteristics to optimally extend pump service life.

Note that in certain embodiments, the preload flange may comprise a substantially cylindrical periphery associated with substantially longitudinal shear. Other embodiments may comprise a non-cylindrical periphery for facilitating annular shear preload having both longitudinal and transverse components associated with viscoelastic flow past the flange.

Note further that the first predetermined assembly resonant frequency of greatest interest, of course, will typically approximate one of the natural resonances of the pump and/or pump housing. Further, complementary hysteresis loss and vibration spectrum narrowing may be added via a second predetermined assembly resonant frequency achieved via the viscoelastic groove element (which may comprise a circumferential tubular shear-thickening component for reinforcement). The time-varying viscosity of the shear-thickening component, if present, furnishes a constraint of the vibrating structure analogous in part to that provided by the adjustable preload flange. The result is a predetermined shift of the tunable valve assembly's vibrating mode analogous to that described above.

In addition to a shift in the tunable valve assembly's vibrating mode, incorporation of a circumferential tubular shear-thickening material within the viscoelastic groove element increases impulse duration by slightly slowing valve closure by reinforcing the viscoelastic groove element. Increased impulse duration, in turn, narrows the closing energy impulse vibration spectrum. And the shear-thickening material itself is effectively constrained by its circumferential location within the viscoelastic groove element.

The shear-thickening material (sometimes termed dilatant material) is relatively stiff near the time of impact and relatively fluid at other times. Since the viscoelastic groove element strikes the valve seat before the valve body, complete valve closure is slightly delayed by the shear-thickening action. The delay effectively increases the valve-closure energy impulse's duration, which means that vibration which is transmitted from the tunable valve assembly to its valve seat and pump housing has a relatively narrower spectrum and is less likely to excite vibrations that predispose a pump housing to early fatigue failure. The degree of spectrum narrowing can be tuned to minimize excitation of known pump housing resonances by appropriate choice of the shear-thickening material. Such vibration attenuation, and the associated reductions in metal fatigue and corrosion susceptibility, are especially beneficial in cases where the fluid being pumped is corrosive.

The functions of the viscoelastic groove element, with its circumferential shear-thickening material, are thus seen to include those of a conventional valve seal as well as those of a tuned vibration damper. See, e.g., U.S. Pat. No. 6,026,776, incorporated by reference. Further, the viscoelastic reservoir element, functioning with a predetermined annular shear preload provided via the adjustable preload flange, can dissipate an additional portion of valve-closure impulse energy as heat while also damping vibration. And viscoelastic fenestration elements, when present, may contribute further to hysteresis loss as they elastically retain the groove element in the seal-retention groove via coupling to the reservoir element. Overall hysteresis loss in the viscoelastic elements combines with hysteresis loss in the valve body to selectively reduce the amplitude and duration of vibrations that the closing impulse energy would otherwise tend to excite in the valve and/or pump housing.

Examples of such selective vibration reductions are seen in the interactions of the viscoelastic reservoir element with the adjustable preload flange. The interactions contribute to hysteresis loss in a tunable valve assembly by, for example, creating what has been termed shear damping (see, e.g., U.S. Pat. No. 5,670,006, incorporated by reference). With the preload flange adjustably fixed centrally to the valve body (e.g., fixed to a central guide stem), valve-closure impact causes both the preload flange and guide stem to temporarily move distally with respect to the (peripheral) valve seat interface (i.e., the valve body experiences a concave-shaped flexure). The impact energy released during valve closure causes temporary deformation of the valve body; that is, the valve body periphery (e.g., the valve seat interface) is stopped by contact with the valve seat while the central portion of the valve body continues (under inertial forces and pumped-fluid pressure) to elastically move distally. Thus, the annular constrained area of the viscoelastic reservoir element (shown constrained by the preload flange in the schematic illustrations herein) moves substantially countercurrent (i.e., in shear) relative to the annular unconstrained area (shown radially farther from the guide stem and peripheral to the preload flange). That is, relative distal movement of the preload flange thus tends to extrude the (more peripheral) annular unconstrained area proximally. Energy lost (i.e., dissipated) in connection with the resulting shear strain in the viscoelastic element is subtracted from the total closing impulse energy otherwise available to excite destructive flow-induced vibration resonances in the valve, valve seat and/or pump housing. See, e.g., U.S. Pat. No. 5,158,162, incorporated by reference.

Another aspect of the interaction of the viscoelastic reservoir element with an adjustable preload flange contributes to vibration damping in a tunable valve assembly. As a result of compliance in the viscoelastic element, longitudinal movement of a guide stem and a coupled preload flange results in a phase lag as shear stress develops within the viscoelastic material. This is analogous to the phase lag seen in the outer ring movement in an automotive elastomeric torsional vibration damper or the antiphase movement of small masses in an automotive pendulum vibration damper. See, e.g., the '776 patent cited above. Adjusting the shear preload flange as described above effectively changes the tunable valve assembly's compliance and thus the degree of phase lag noted above. One may thus tune viscoelastic element preload to achieve effective vibration damping at specific frequencies of interest (e.g., pump housing resonant frequencies).

To achieve the desired hysteresis loss and vibration damping effects described herein, different viscoelastic and/or composite elements may be constructed to have specific elastic and/or viscoelastic properties. Note that the term elastic herein implies substantial characterization by a storage modulus, whereas the term viscoelastic herein implies substantial characterization by a storage modulus and a loss modulus. See, e.g., the '006 patent cited above.

Specific desired properties for each viscoelastic element arise from a design concept requiring coordinated functions depending on the location of each element. The viscoelastic reservoir element affects hysteresis associated with longitudinal compliance of the tunable valve assembly because it viscoelasticly accommodates longitudinal deformation of the valve body toward a concave shape. Hysteresis in the viscoelastic groove element (related, e.g., to its valve seal and vibration damping functions) and the valve body itself further reduces closing energy impulse amplitude through dissipation of portions of closing impulse energy as heat.

Elastic longitudinal compliance of a tunable valve assembly results in part from elastic properties of the materials comprising the tunable valve assembly. Such elastic properties may be achieved through use of composites comprising reinforcement materials as, for example, in an elastic valve body comprising steel, carbon fiber reinforced polymer, carbon nanotube reinforced polymer, and/or carbon nanotube reinforced metal matrix. The polymer may comprise a polyaryletherketone (PAEK), for example, polyetheretherketone (PEEK). See, e.g., U.S. Pat. No. 7,847,057 B2, incorporated by reference.

The description herein of valve body flexure as concave-shaped refers to a view from the proximal or high-pressure side of the valve body. Such flexure is substantially elastic and may be associated with slight circular rotation (i.e., a circular rolling contact) of the valve body's valve seat interface with the valve seat itself. When the degree of rolling contact is sufficient to justify conversion of the valve seat interface from the traditional frusto-conical shape to a convex curved shape (which may include, e.g., circular, elliptic and/or parabolic portions), a curved concave valve seat may be used. In such cases, the valve seat interface has correspondingly greater curvature than the concave valve seat (see Detailed Description herein). Such rolling contact, when present, augments elastic formation of the concave valve body flexure on the pump pressure stroke, reversing the process on the suction stroke.

The circular rolling contact described herein may be visualized by considering the behavior of the convex valve seat interface as the valve body experiences concave flexure (i.e., the transformation from a relatively flat shape to a concave shape). During such flexure the periphery of the valve seat interface rotates slightly inwardly and translates slightly proximally (relative to the valve body's center of gravity) to become the proximal rim of the concave-shaped flexure.

While substantially elastic, each such valve body flexure is associated with energy loss from the closing energy impulse due to hysteresis in the valve body. Frictional heat loss (and any wear secondary to friction) associated with any circular rolling contact of the convex valve seat interface with the concave valve seat is intentionally relatively low. Thus, the rolling action, when present, minimizes wear that might otherwise be associated with substantially sliding contact of these surfaces. Further, when rolling contact between valve body and valve seat is present during both longitudinal valve body flexure and the elastic rebound which follows, trapping of particulate matter from the pumped fluid between the rolling surfaces tends to be minimized.

In addition to the above described energy dissipation (associated with hysteresis secondary to valve body flexure), hysteresis loss will also occur during pressure-induced movements of the viscoelastic groove element (in association with the valve seal function). Note that pumped fluid pressure acting on a valve comprising the invention's tunable valve assembly will hydraulically pressurize substantially all of the viscoelastic elements in a tunable valve assembly. Although polymers suitable for use in the viscoelastic elements generally are relatively stiff at room ambient pressures and temperatures, the higher pressures and temperatures experienced during pump pressure strokes tend to cause even relatively stiff polymers to behave like fluids which can transmit pressure hydraulically. Thus, a viscoelastic element in a peripheral seal-retention groove is periodically hydraulically pressurized, thereby increasing its sealing function during the high-pressure portion of the pump cycle. Hydraulic pressurization of the same viscoelastic element is reduced during the low-pressure portion of the pump cycle when the sealing function is not needed.

Another aspect of the formation of a concave valve body flexure under the influence of a closing energy impulse is that the momentum of pumped fluid which moves in contact with the tunable valve assembly is smoothly redirected (at least in part) laterally and proximally. Forces due to oppositely directed radial components of the resultant fluid flow tend to cancel, and energy lost as heat in pumped fluid turbulence is subtracted from that of the valve-closure energy impulse, thus decreasing its amplitude.

Because of the above-described energy loss and the time required for valve body longitudinal deformation to take place, with the associated dissipation of closing impulse energy described above, a valve-closure energy impulse applied to a tunable valve assembly is relatively lower in amplitude and longer in duration (e.g., secondary to having a longer rise time) than an analogous valve-closure energy impulse applied to a conventionally stiff valve body which closes on a conventional frusto-conical valve seat. The combination of lower amplitude and increased duration of the valve-closure energy impulse results in a narrowed characteristic vibration bandwidth having reduced potential for induction of damaging resonances in the valve, valve seat, and adjacent portions of the pump housing. See, e.g., the above-cited '242 patent.

In continuous pump operation, repetitive elastic longitudinal compression and valve body flexure are followed by elastic rebound under the influence of a series of relatively brief closing energy impulses. Cumulative energy loss in the form of heat (e.g., hysteresis loss plus friction loss) is continuously transported for redistribution within the valve body and eventual rejection to the valve body surroundings (including, e.g., the pumped fluid). This heat, which is substantially lost to the valve body surroundings, represents a reduction in the energy content (and thus the damage-causing potential) of the valve-closure energy impulse applied to the valve body.

Note that in describing the fluid-like behavior of certain polymers herein under elevated heat and pressure, the term "polymer" includes relatively homogenous materials (e.g., a single-species fluid polymer) as well as composites and combination materials containing one or more of such relatively homogenous materials plus finely divided particulate matter (e.g., nanoparticles) and/or other dispersed species (e.g., species in colloidal suspension) to improve heat scavenging and/or other properties. See, e.g., U.S. Pat. No. 6,432,320 B1, incorporated by reference.

In addition to heat scavenging, damping is a function of the viscoelastic elements in various embodiments of the invention. Optimal damping is associated with relatively high storage modulus and loss tangent values, and is obtained over various temperature ranges in multicomponent systems described as having macroscopically phase-separated morphology, microheterogeneous morphology, and/or at least one interpenetrating polymer network. See, e.g., the above-cited '006 patent and U.S. Pat. Nos. 5,091,455; 5,238,744; 6,331,578 B1; and 7,429,220 B2, all incorporated by reference.

Briefly summarizing salient points of the above description, recall first that vibration attenuation in a tunable valve assembly of the invention operates via four interacting mechanisms. First, impulse amplitude is reduced by converting a portion of total closing impulse energy to heat (e.g., via hysteresis), which is then ultimately rejected to the valve body surroundings (e.g., the pumped fluid). Each such reduction of impulse amplitude means lower amplitudes in the characteristic vibration spectrum transmitted to the pump housing.

Second, the closing energy impulse as sensed at the valve seat is reshaped (e.g., by lengthening the cycle time associated with peripheral valve seal compression, concave valve body flexure and elastic rebound). Such reshaping may be accomplished using mechanical/hydraulic/pneumatic analogs of electronic wave-shaping techniques. The result is a corresponding reduction of the impulse's characteristic bandwidth (and thus reduction of the damage potential of induced vibrations). In other words, bandwidth narrowing is achieved in embodiments of the invention through an increase of the effective impulse duration (as by, e.g., slowing the impulse's rise time and/or fall time as the valve assembly's components flex and relax over a finite time interval).

Third, induced vibration resonances of the tunable valve assembly, valve seat, and/or pump housing structures are effectively damped by interactions generating turbulence (and thus dissipating heat) in the pumped fluid.

And fourth, the potential for excitation of damaging resonances in pump vibration induced by a closing energy impulse is further reduced through narrowing of the impulse's characteristic vibration bandwidth by increasing the valve body's effective inertia without increasing its actual mass. Such an increase of effective inertia is possible because a portion of pumped fluid moves with the valve body as it flexes and/or longitudinally compresses. The mass of this portion of pumped fluid is effectively added to the valve body's mass during the period of flexure/relaxation, thereby increasing the valve body's effective inertia to create a low-pass filter effect (i.e., tending to block higher frequencies).

To increase understanding of the invention, three embodiments are discussed herein only as illustrative examples. In a first invention embodiment a tunable suction valve comprises a tunable valve assembly and a valve seat. The tunable valve assembly is symmetrical about a longitudinal axis and comprises a valve body, guide means, and a plurality of viscoelastic elements. The valve body comprises a peripheral valve seat interface and a peripheral groove spaced apart from a central annular reservoir, while guide means include one or more structures known to those skilled in the art for maintaining valve body alignment within a suction bore. Guide means include, e.g., a central guide stem and/or a distal crowfoot guide.

The plurality of viscoelastic elements comprises a viscoelastic reservoir (or central) element at least partially constrained as it is disposed in the central annular reservoir. That is, the viscoelastic reservoir element is at least partially constrained by the interior surface(s) of the annular reservoir and/or by one or more structures coupled to such surface(s). A viscoelastic groove (or peripheral) element is disposed in the peripheral groove, the viscoelastic groove element optionally comprising a circumferential tubular area (which may comprise a plurality of lumens).

The (at least) partially constrained viscoelastic reservoir element has at least a first predetermined assembly resonant frequency substantially replicating a measured resonant frequency (e.g., a resonant frequency measured proximate the suction bore of a pump housing in which the valve is to be, or is, installed). And the circumferential tubular area comprises at least one shear-thickening material having at least a second predetermined assembly resonant frequency similar to the first predetermined assembly resonant frequency.

Note that the viscoelastic reservoir element may have at least one unconstrained area, and that unconstrained area may be open to pumped fluid pressure.

A tunable valve assembly analogous to that described in the first invention embodiment may be incorporated in a tunable discharge valve as well as the tunable suction valve described above. Either a tunable suction valve or a tunable discharge valve or both may be installed in a pump fluid end housing, the pump housing having a resonant frequency substantially equal to the first predetermined assembly resonant frequency of each of the tunable valve(s) installed. These combinations would be applications of the invention's first embodiment. The valve assembly of the first embodiment may, also or alternatively, be installed in a pump housing having a resonant frequency substantially equal to the second predetermined assembly resonant frequency. This combination would be yet another application of the invention's first embodiment.

If, as shown for example herein, the valve body has guide means comprising a guide stem centered in the reservoir, the reservoir itself has an annular shape centered on the guide stem. Fenestrations, when present in the groove wall, may be equally spaced, being symmetrically arranged as shown herein. At least a portion of each fenestration may have a transverse area which increases with decreasing radial distance to said longitudinal axis. That is, each fenestration flares to greater transverse areas in portions closer to the longitudinal axis, relative to the transverse areas of portions of the fenestration which are more distant from the longitudinal axis. Thus, a flared fenestration is partly analogous to a conventionally flared tube, with possible differences arising from the facts that (1) fenestrations are not limited to circular cross-sections, and (2) the degree of flare may differ in different portions of a fenestration.

As noted above, the valve body's valve seat interface may have a convex curve to facilitate rolling contact with a corresponding valve seat. If it has a convex curve, the valve seat interface may have, e.g., circular, elliptic and/or parabolic portions to effectively seal against optionally curved portions on a mating valve seat surface. Such optional corresponding curvature facilitates rolling contact which effectively seals against fluid leakage while reducing wear on mating surfaces.

In a second invention embodiment a tunable suction valve comprises a tunable valve assembly and a valve seat. The tunable valve assembly is substantially symmetrical about a longitudinal axis and comprises a valve body and a plurality of viscoelastic elements. The valve body has a peripheral valve seat interface and a peripheral groove spaced apart from a central longitudinal guide stem by an annular reservoir, the peripheral groove being responsive to longitudinal compressive force on the tunable suction valve.

The plurality of viscoelastic elements comprises viscoelastic groove and reservoir elements which lie in the groove and reservoir respectively. The tunable valve assembly comprises an adjustable preload flange coupled to the guide stem, the flange imposing an adjustable annular constraint on the viscoelastic reservoir element for achieving at least a first predetermined assembly resonant frequency substantially replicating a measured resonant frequency (e.g., a resonant frequency measured proximate the suction bore of a pump housing in which the valve is to be, or is, installed). The tunable valve assembly may additionally comprise at least one circumferential tubular area in the viscoelastic groove element, each tubular area (which may comprise a plurality of lumens) being substantially filled with at least one shear-thickening material having at least a second predetermined assembly resonant frequency similar to the first predetermined assembly resonant frequency.

A tunable valve assembly analogous to that described in the second invention embodiment may be incorporated in a tunable discharge valve as well as the tunable suction valve described above. Either a tunable suction valve or a tunable discharge valve or both may be installed in a pump fluid end housing, the pump housing having a resonant frequency substantially equal to the first predetermined assembly resonant frequency of each of the tunable valve(s) installed. These combinations would be applications of the invention's second embodiment. The valve assembly of the second embodiment may, also or alternatively, be installed in a pump housing having a resonant frequency substantially equal to the second predetermined assembly resonant frequency. This combination would be yet another application of the invention's second embodiment.

The flange may or may not be longitudinally fixed to the guide stem. And at least one additional flange may be added to the above second invention embodiment to form one or more dependent embodiments. Any such additional flange(s) extend radially from the guide stem and may or may not be longitudinally fixed to the guide stem for achieving one or more predetermined assembly resonant frequencies.

Further, a tunable valve assembly of the second invention embodiment may comprise a viscoelastic element comprising at least one polymer composite. The polymer composite may be described as comprising PAEK, PEEK, and/or various urethane-based polymers.

In certain invention embodiments, a plurality of viscoelastic fenestration elements comprising at least one polymer composite is integrated with a corresponding tunable valve assembly of the second invention embodiment, the viscoelastic fenestration elements (functioning as radial tension members) lie within fenestrations in the peripheral groove (e.g., in the longitudinal groove wall as described below). Radial tension members then connect the viscoelastic groove element (i.e., an annular outer portion lying at least partially within a peripheral seal-retention groove) with the viscoelastic reservoir element (i.e., a central portion lying at least partially within the reservoir). Normal curing of the polymers comprising the viscoelastic reservoir element is typically associated with shrinkage which will tend to put the radial members in tension. The tensioned radial members, which are schematically illustrated herein, will tend to firmly anchor the coupled viscoelastic groove element firmly within the peripheral seal-retention groove without the use of adhesives and/or serrations as have been commonly used in anchoring conventional valve seals.

In a third invention embodiment, a tunable suction valve comprises a tunable valve assembly and a valve seat. The tunable valve assembly comprises a valve body substantially symmetrical about a longitudinal axis, an adjustable preload flange centrally coupled to the valve body, guide means, and a plurality of viscoelastic elements. The valve body comprises a peripheral valve seat interface and a peripheral groove coupled to a central reservoir, the peripheral groove being responsive to longitudinal compressive force on the tunable valve assembly. Guide means include one or more structures known to those skilled in the art for maintaining valve body alignment within a suction bore. Guide means include, e.g., a central guide stem and/or a distal crow-foot guide.

The plurality of viscoelastic elements comprises a groove element disposed in the peripheral groove and a reservoir element disposed in the central reservoir, the reservoir element comprising at least one area constrained by the adjustable preload flange to achieve at least a first predetermined assembly resonant frequency substantially replicating a measured resonant frequency (e.g., a resonant frequency measured proximate the suction bore of a pump housing in which the valve is to be, or is, installed). The tunable valve assembly additionally comprises at least one circumferential tubular area in the viscoelastic groove element. Each tubular area (which may comprise a plurality of lumens) is substantially filled with at least one shear-thickening material having at least a second predetermined assembly resonant frequency similar to the first predetermined assembly resonant frequency.

The adjustable preload flange noted above may have a non-cylindrical periphery to provide expressly for generation of transverse shear in the viscoelastic element. Such an invention embodiment provides for damping of transverse as well as longitudinal vibration. Transverse vibration may originate, for example, when slight valve body misalignment with the valve seat causes abrupt lateral valve body movement during valve closing.

A tunable valve assembly analogous to that described in the third invention embodiment may be incorporated in a tunable discharge valve as well as the tunable suction valve described above. Either a tunable suction valve or a tunable discharge valve or both may be installed in a pump fluid end housing, the pump housing having a resonant frequency substantially equal to the first predetermined assembly resonant frequency of each of the tunable valve(s) installed. These combinations would be applications of the invention's third embodiment. The valve assembly of the third embodiment may, also or alternatively, be installed in a pump housing having a resonant frequency substantially equal to the second predetermined assembly resonant frequency. This combination would be yet another application of the invention's third embodiment.

As noted above, various invention embodiments may comprise carbon fiber reinforced polymer, and the polymer may comprise PAEK. In the latter case, the polymer may comprise PEEK. Such an embodiment, combining high strength with flexibility and relatively light weight, demonstrates the beneficial effects described above.

Note that in addition to the example embodiments described herein, still other alternative invention embodiments exist, including valves, pump housings and pumps comprising one or more of the example embodiments or equivalents thereof. During fabrication, internal valve body spaces may be formed by welding (e.g., inertial welding or laser welding) valve body portions together as in the above-cited '837 patent, or by separately machining such spaces with separate coverings. Valve body fabrication may also be by rapid-prototyping (i.e., layer-wise) techniques. See, e.g., the above-cited '057 patent. An viscoelastic element may be cast and cured in place in a valve body as described herein. See, e.g., U.S. Pat. No. 7,513,483 B1, incorporated by reference.

DETAILED DESCRIPTION

Figure 7:
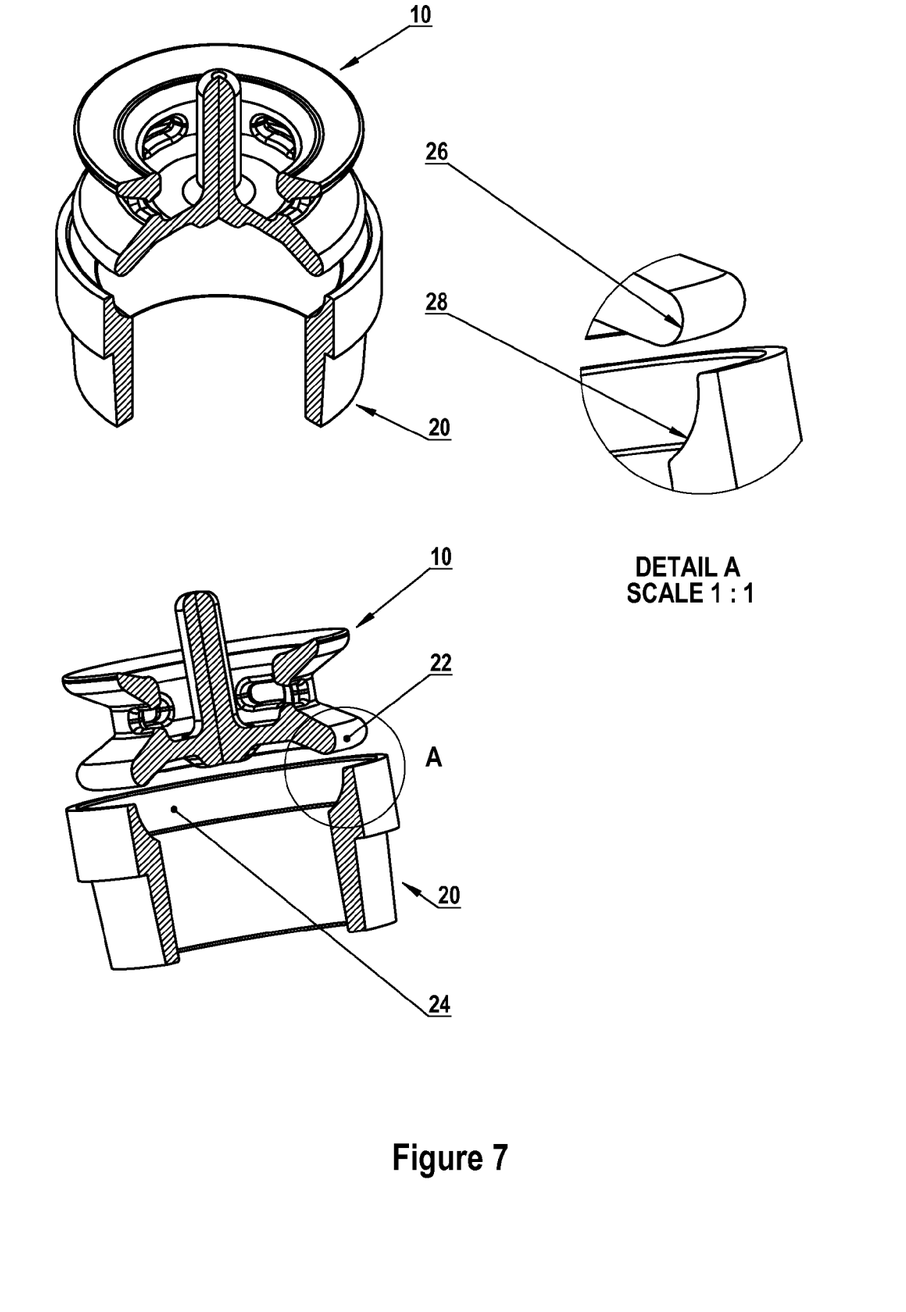
FIG. 7 is a schematic illustration of two views of an exploded partially-sectioned 3-dimensional view of a valve body and valve seat. Curved longitudinal section edges of the valve body's valve seat interface and mating portions of the valve seat are shown schematically in detail to aid description herein of a rolling valve seal. A tunable (suction or discharge) valve of the invention comprises a combination of a tunable valve assembly (see, e.g., FIG. 1) and a valve seat (see, e.g., FIG. 7).

In general, a tunable (suction or discharge) valve of the invention comprises a combination of a tunable valve assembly 99 (see, e.g., FIG. 1) and a valve seat 20 (see, e.g., FIG. 7). Details of the structure and functions of each component are provided herein both separately and as combined with other components to obtain synergistic benefits contributing to longer pump service life.

Figure 1:
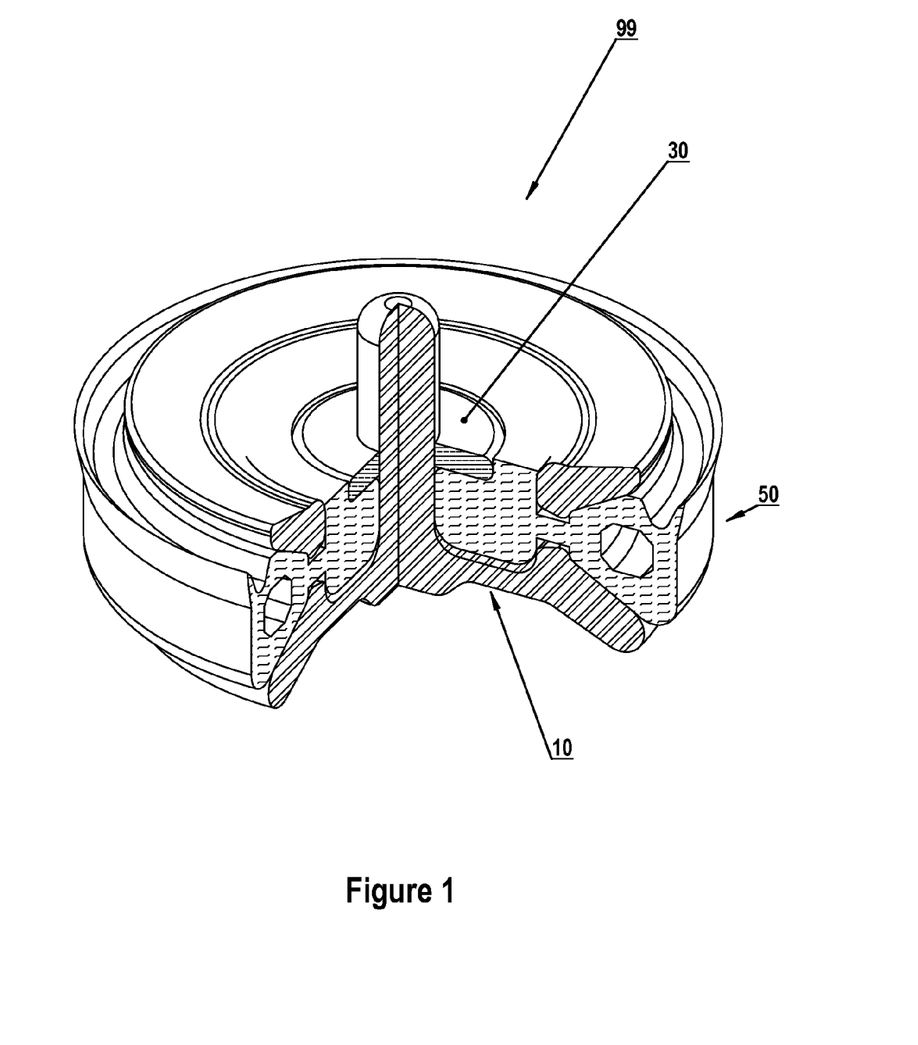
FIG. 1 is a schematic 3-dimensional view of a partially sectioned tunable valve assembly showing how an adjustable preload flange contacts an area of the viscoelastic reservoir element as described herein.

FIG. 1 schematically illustrates an invention embodiment of a tunable valve assembly 99 substantially symmetrical about a longitudinal axis. Valve assembly 99 comprises a valve body 10, an adjustable preload flange 30, and a plurality of viscoelastic elements 50. Valve body 10, in turn, comprises a peripheral groove 12 (see FIG. 2) spaced apart by an annular reservoir 16 from a longitudinal guide stem 14, groove 12 being responsive to longitudinal compressive force on tunable valve assembly 99. A plurality of viscoelastic elements 50 is comprises an annular reservoir element 52 coupled to a (peripheral) groove element 54 by a plurality of (optional) radial fenestration elements 56. Groove element 54 functions as a vibration damper and valve seal, comprising at least one circumferential tubular area 58.

Responsiveness of groove 12 to longitudinal compressive force is characterized by damping of groove wall vibration in tunable valve assembly 99. Such damping is due to out-of-phase vibrations in proximal groove wall 13 and distal groove wall 11 which are induced by longitudinal compressive force. Such out-of-phase vibrations will cause various groove-related dimensions to vary with longitudinal compressive force, thereby indicating the responsiveness of groove 12 to such force (see, for example, the dimension labeled A in FIG. 2). Each phase shift, in turn, is associated with differences in the coupling of proximal groove wall 13 to guide stem 14 (indirectly via longitudinal groove wall 15 and radial reservoir floor 19) and the coupling of distal groove wall 11 to guide stem 14 (directly via radial reservoir floor 19). Note that longitudinal groove wall 15 may comprise fenestrations 18, thereby increasing groove 12's responsiveness to longitudinal compressive force on tunable valve assembly 99.

Figure 2:
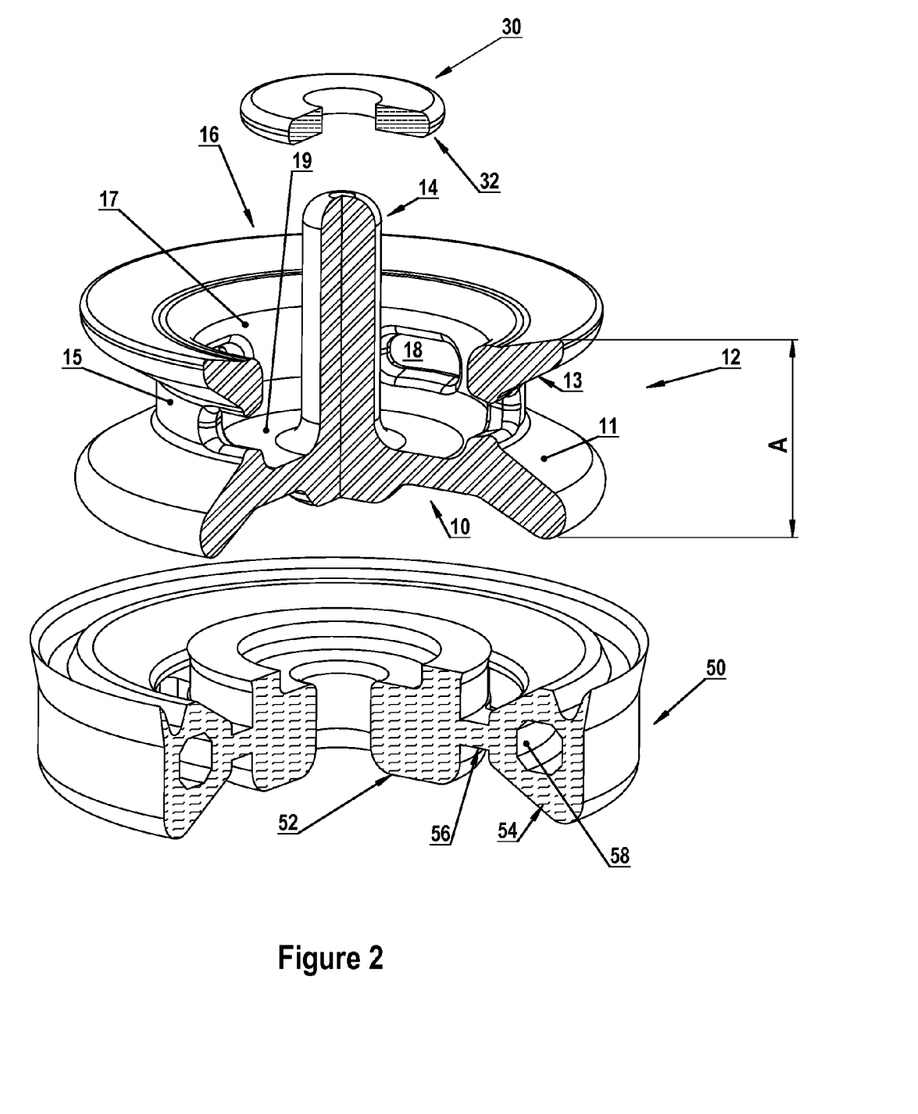
FIG. 2 includes a schematic 3-dimensional exploded view of the tunable valve assembly of FIG. 1 showing viscoelastic elements, the valve body, and the adjustable preload flange.
Figure 3:
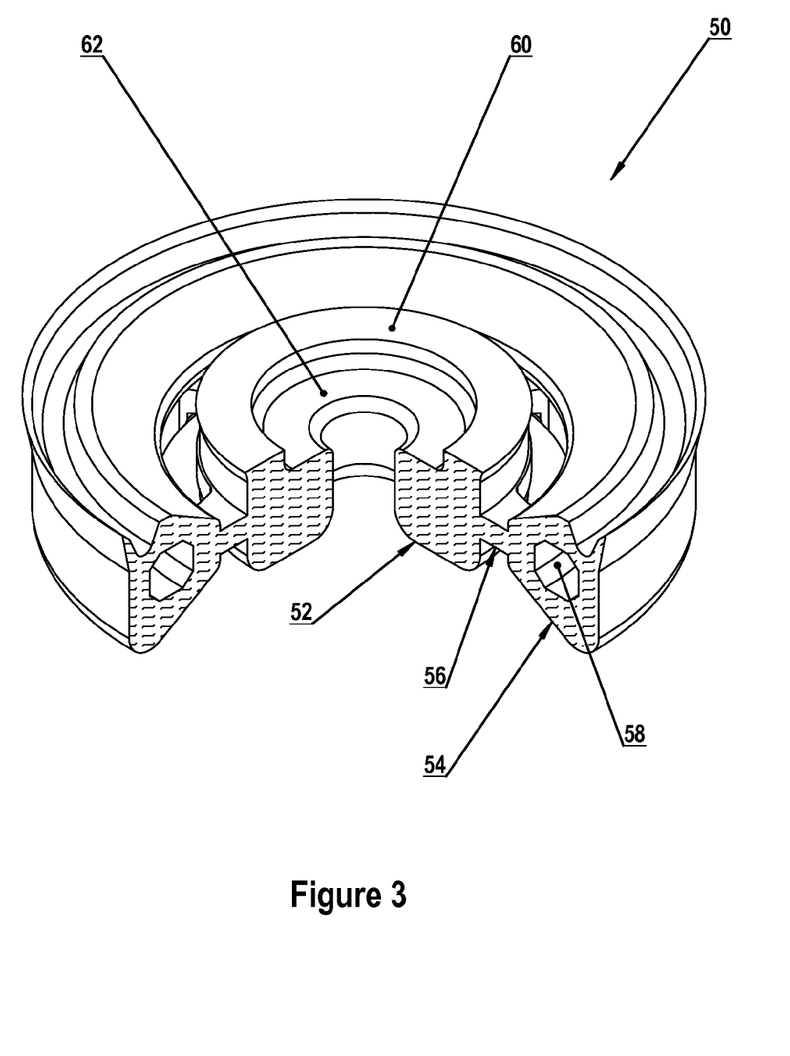
FIG. 3 is a schematic 3-dimensional partially-sectioned view of viscoelastic reservoir, groove and fenestration elements showing the constrained area of the reservoir element where it contacts an adjustable preload flange, as well as an adjacent unconstrained area.

Referring to FIGS. 1-3, adjustable preload flange 30 extends radially from guide stem 14 (toward peripheral reservoir wall 17) over about 20% to about 80% of viscoelastic reservoir element 52 (see FIG. 3). Adjustable preload flange 30 thus imposes an adjustable annular shear preload over an annular constrained area 62 of viscoelastic reservoir element 52 to achieve at least a first predetermined assembly resonant frequency substantially replicating a measured resonant frequency (e.g., a pump housing resonant frequency). Note that an adjacent annular unconstrained area 60 of viscoelastic reservoir element 52 remains open to pumped fluid pressure. Note also that adjustable preload flange 30 may be adjusted in effective radial extent and/or longitudinal position.

Note further that annular constrained area 62 and annular unconstrained area 60 are substantially concentric and adjacent. Thus, as longitudinal (i.e., distal) compressive restraint is applied via preload flange 30 to annular constrained area 62, annular unconstrained area 60 will tend to move (i.e., extrude) proximally. The oppositely-directed (i.e., countercurrent) movements of constrained and unconstrained annular areas of viscoelastic reservoir element 52 create a substantially annular area of shear stress.

Figure 5:
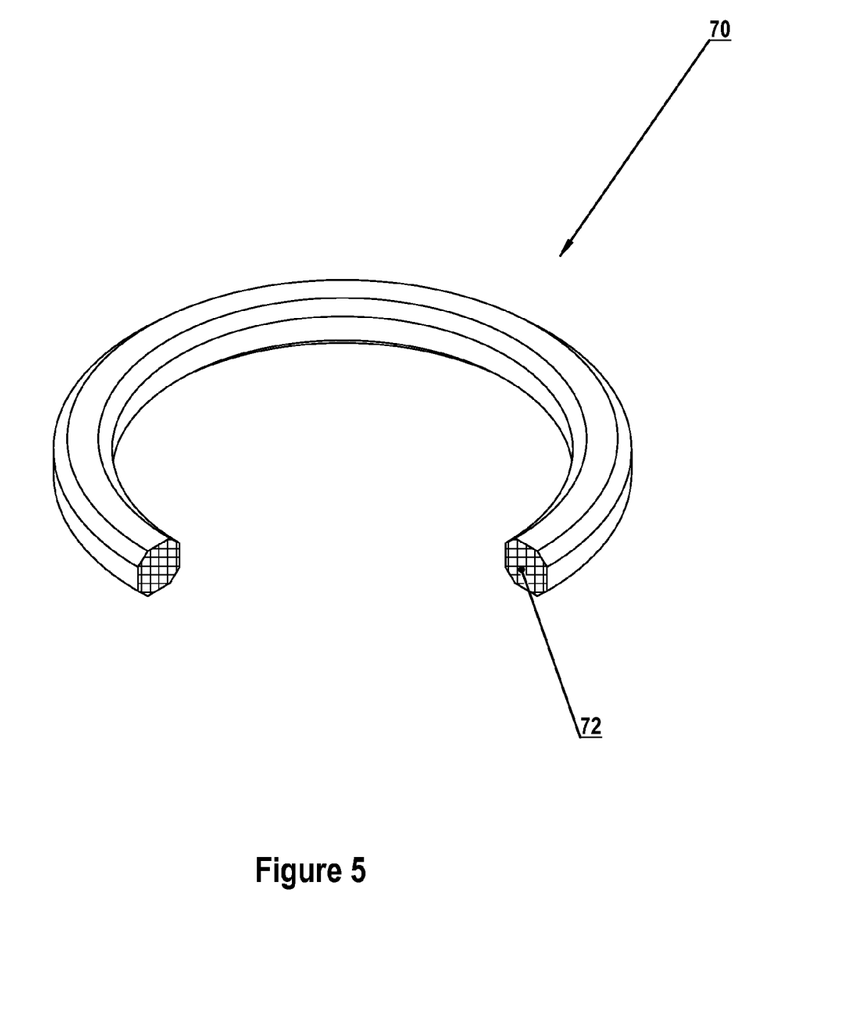
FIG. 5 is a schematic 3-dimensional instantaneous partially-sectioned view of shear-thickening material which would substantially fill a circumferential tubular area in the viscoelastic groove element.

Finally, each circumferential tubular area 58 is substantially filled with at least one shear-thickening material 70 (see FIG. 5) chosen to achieve at least a second predetermined assembly resonant frequency similar to the first predetermined assembly resonant frequency). Note that FIG. 5 schematically represents a partially-sectioned view of an instantaneous configuration of the shear-thickening material 70 within circumferential tubular area 58.

In an alternate invention embodiment a tunable valve assembly 99 comprises a valve body 10 substantially symmetrical about a longitudinal axis, valve body 10 having a peripheral groove 12 spaced apart from a (central longitudinal) guide stem 14 by an annular reservoir 16. Groove 12 is responsive to longitudinal compressive force on tunable valve assembly 99 (see discussion above). Viscoelastic elements 50 (comprising reservoir element 52 and groove element 54) are integrated with (i.e., lie substantially in) reservoir 16 and groove 12 respectively. An adjustable preload flange 30 is coupled to guide stem 14 and contacts viscoelastic reservoir element 52 in reservoir 16 to impose an adjustable annular constraint on viscoelastic reservoir element 52 for achieving at least a first predetermined assembly resonant frequency substantially replicating a measured resonant frequency (e.g., a pump housing resonant frequency). Such adjustable annular constraint imposes an adjustable shear preload between constrained annular area 62 and unconstrained annular area 60. Tunable valve assembly 99 may additionally comprise at least one circumferential tubular area 58 in groove element 54 residing in groove 12, each tubular area 58 being substantially filled with at least one shear-thickening material 70 chosen to achieve at least a second predetermined assembly resonant frequency similar to the first predetermined assembly resonant frequency).

The valve assembly of the alternate embodiment may be installed in a pump housing having a measured housing resonant frequency; the measured housing resonant frequency may then be substantially replicated in the first predetermined resonant frequency of the tunable valve assembly. Such a combination would be an application of the invention's alternate embodiment. An analogous tuning procedure may be followed if the tunable valve assembly of the second embodiment is installed in a pump having a (similar or different) resonant frequency substantially equal to the second predetermined resonant frequency. This synergistic combination would broaden the scope of the valve assembly's beneficial effects, being yet another application of the invention's alternate embodiment.

In another alternate invention embodiment, tunable valve assembly 99 comprises a valve body 10 substantially symmetrical about a longitudinal axis, an adjustable preload flange 30 centrally coupled to valve body 10, and a plurality of viscoelastic elements 50 (comprising reservoir element 52 and groove element 54). Valve body 10 comprises a (peripheral) groove 12 coupled to a (central) reservoir 16. Groove 12 is responsive to longitudinal compressive force on tunable valve assembly 99 (see discussion above). Viscoelastic reservoir element 52 comprises at least one constrained area 62 (adjacent to unconstrained area 60), area 62 being constrained by adjustable preload flange 30 to achieve at least a first predetermined assembly resonant frequency substantially replicating a measured resonant frequency (e.g., a pump housing resonant frequency). Groove element 54 is chosen to achieve at least a second predetermined assembly resonant frequency, and may comprise at least one circumferential tubular area 58. Each circumferential tubular area 58 may be substantially filled with at least one shear-thickening material 70.

Note that preload flange 30 may have a non-cylindrical periphery 32 for imposing on viscoelastic reservoir element 52 an adjustable annular shear preload having both longitudinal and transverse components.

Figure 4:
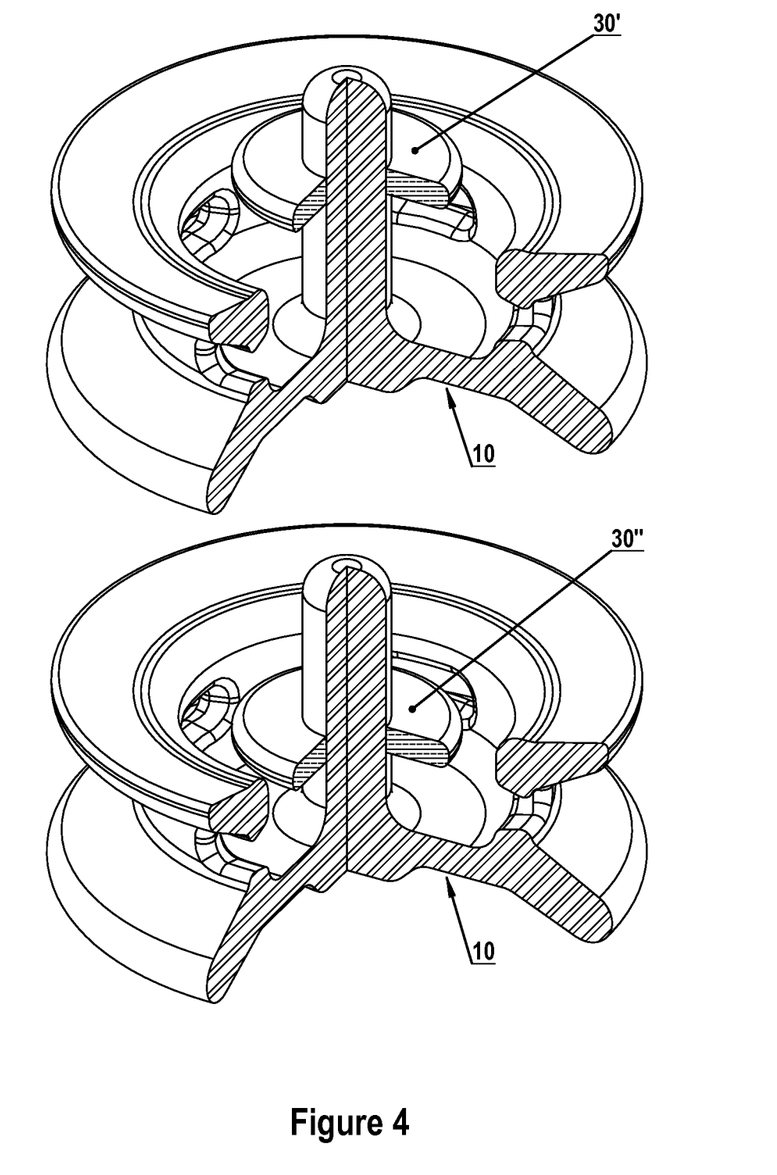
FIG. 4 is a schematic 3-dimensional partially-sectioned view of two valve bodies with an adjustable preload flange located at different longitudinal positions on a central guide stem.

Note further that the periphery of adjustable preload flange 30, if cylindrical, predisposes a tunable valve assembly to substantially longitudinal shear damping with each longitudinal distortion of valve body 10 associated with valve closure. In contrast, as shown in FIG. 4, the periphery of a longitudinally adjusted preload flange 30' or 30" may introduce shear damping of variable magnitude and having both longitudinal and transverse components. Such damping may be beneficial in cases where significant transverse valve-generated vibration occurs.

To clarify the placement of viscoelastic elements 50, labels indicating the portions are placed on a sectional view in FIGS. 2 and 3. Actual placement of viscoelastic elements 50 in valve body 10 (see FIG. 1) may be by, for example, casting viscoelastic elements 50 in place, or placing viscoelastic elements 50 (which have been precast) in place during layer-built or welded fabrication. The tunable valve assembly embodiment of the invention is intended to represent valve body 10 and viscoelastic elements 50 components at any stage of manufacture leading to functional integration of the two components.

To enhance scavenging of heat due to friction loss and/or hysteresis loss, shear-thickening material 70 and/or viscoelastic elements 50 may comprise one or more polymers which have been augmented with nanoparticles 72 (see, e.g., FIG. 5). Nanoparticles are generally invisible to the eye as they are typically dispersed in a colloidal suspension. Hence, they are schematically represented by cross-hatching 72 in FIG. 5. Nanoparticles may comprise, for example, carbon and/or metallic materials such as copper, beryllium, titanium, nickel, iron, alloys or blends thereof. The term nanoparticle may conveniently be defined as including particles having an average size of up to about 2000 nm. See, e.g., the '320 patent.

Figure 6:
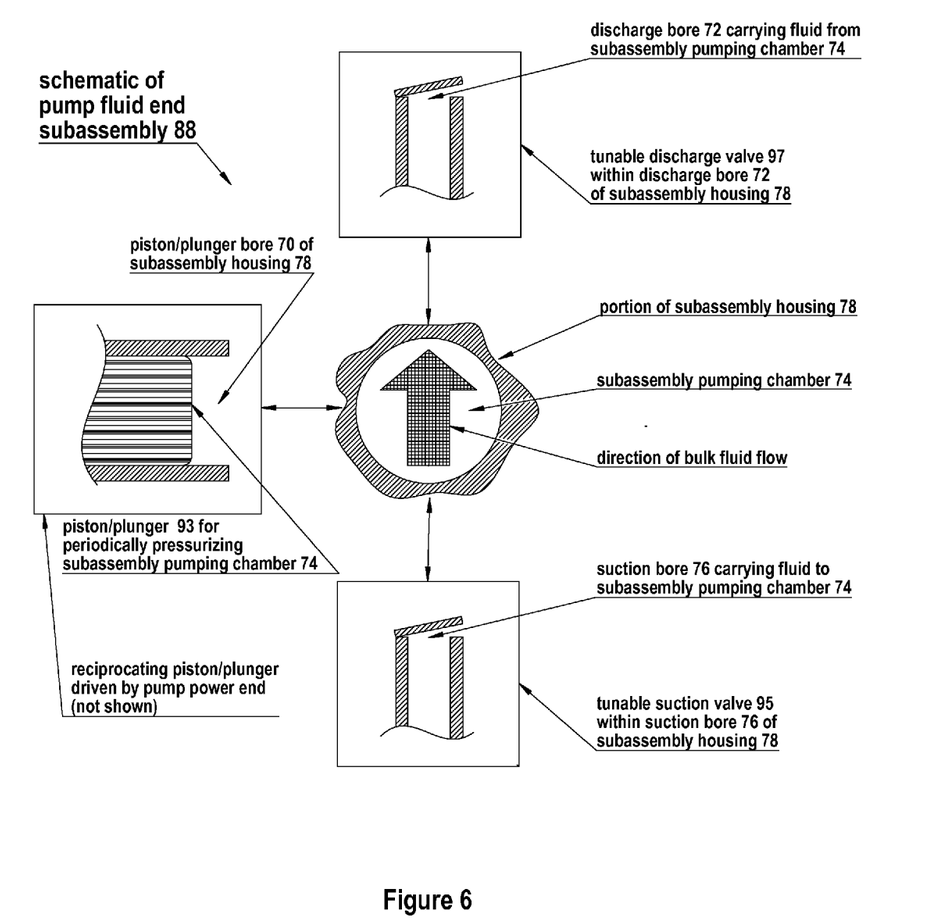
FIG. 6 is a schematic illustration of an exploded partially-sectioned 2-dimensional view of major components of a pump fluid end subassembly, together with brief explanatory comments on component functions. The schematically-illustrated subassembly comprises a pumping chamber within a subassembly pump housing, the pumping chamber being in fluid communication with a suction bore, a discharge bore, and a piston/plunger bore. Schematic representations of a suction valve, a discharge valve, and a piston/plunger are shown in their respective bores, together with brief annotations and graphical aids outlining the structural relationships.

FIG. 6 is a schematic illustration of an exploded partially-sectioned 2-dimensional view of major components of a pump fluid end subassembly 88, together with graphical aids and brief explanatory comments on component functions. The schematically-illustrated subassembly 88 comprises a pumping chamber 74 within a subassembly (pump) housing 78, the pumping chamber 74 being in fluid communication with a suction bore 76, a discharge bore 72, and a piston/plunger bore 70. Schematic representations of a tunable suction valve 95 (illustrated for simplicity as a check valve), a tunable discharge valve 97 (also illustrated for simplicity as a check valve), and a piston/plunger 93 (illustrated for simplicity as a plunger) are shown in their respective bores.

Regarding the graphical aids of FIG. 6, the double-ended arrows that signify fluid communication between the bores (suction, discharge and piston/plunger) and the pumping chamber are double-ended to represent the fluid flow reversals that occur in each bore during each transition between pressure stroke and suction stroke of the piston/plunger. The large single-ended arrow within the pumping chamber is intended to represent the periodic and relatively large, substantially unidirectional fluid flow from suction bore through discharge bore during pump operation.

Further regarding the graphical aids of FIG. 6, tunable suction (check) valve 95 and tunable discharge (check) valve 97 are shown only schematically as check valves in FIG. 6 because of their relative complexity. Construction details of each such check valve are shown in FIGS. 1-5 and 7, each tunable check valve comprising a tunable valve assembly and a valve seat. In general, the tunable valve assemblies of tunable suction and discharge valves will typically be tuned to different assembly resonant frequencies because of their different positions in a subassembly housing 78 (and thus in a pump housing as described herein). Pump housing resonant frequencies that are measured proximate the tunable suction and discharge valves will differ in general, depending on the overall pump housing design. In each case they serve to guide the choices of the respective assembly resonant frequencies for the valves.

Note that the combination of major components labeled in FIG. 6 as a pump fluid end subassembly 88 is so labeled (i.e., is labeled as a subassembly) because typical fluid end configurations comprise a plurality of such subassemblies combined in a single machined block. Thus, in such typical (multi-subassembly) pump fluid end designs, as well as in less-common single-subassembly pump fluid end configurations, the housing is simply termed a "pump housing" rather than the "subassembly housing 78" terminology of FIG. 6.

Further as schematically-illustrated and described herein, each pump fluid end subassembly 88 comprises only major components: a pumping chamber 74, with its associated tunable suction valve 95, tunable discharge valve 97, and piston/plunger 93 in their respective bores 76, 72 and 70. For greater clarity of description, common fluid end features well-known to those skilled in the art (such as access bores, plugs, seals, and miscellaneous fixtures) are not shown. Similarly, a common suction manifold through which incoming pumped fluid is distributed to each suction bore 76, and a common discharge manifold for collecting and combining discharged pumped fluid from each discharge bore 72, are also well-known to those skilled in the art and thus are not shown.

Note that the desired check-valve function of tunable valves 95 and 97 schematically-illustrated in FIG. 6 requires interaction of the respective tunable valve assemblies (see FIGS. 1-5) with a corresponding (schematically-illustrated) valve seat (see FIG. 7). The schematic illustrations of FIG. 6 are only intended to convey general ideas of relationships and functions of the major components of a pump fluid end subassembly. Structural details of the tunable valve assemblies that are in turn part of tunable valves 95 and 97 of the invention (including their respective valve seats) are illustrated in greater detail in FIGS. 1-5 and 7. Such structural details facilitate a plurality of complementary functions that are best understood through reference to FIGS. 1-5 and 7.

The above complementary functions include, but are not limited to, closing energy conversion to heat, energy redistribution through rejection of heat to the pumped fluid and pump housing, vibration damping, selective vibration spectrum narrowing through changes in tunable valve assembly compliance, and selective vibration attenuation through energy dissipation (i.e., via redistribution) at predetermined assembly resonant frequencies.

FIG. 7 is a schematic illustration of two views of an exploded partially-sectioned 3-dimensional view including a valve body 10 and its valve seat interface 22, together with mating surface 24 of valve seat 20. A curved longitudinal section edge 28 of the valve seat's mating surface 24, together with a correspondingly greater curved longitudinal section edge 26 of the valve body's valve seat interface 22, are shown schematically in detail view A to aid description herein of a rolling valve seal.

The correspondingly greater curvature of valve seat interface 22, as compared to the curvature of mating surface 24, effectively provides a rolling seal against fluid leakage which reduces wear on the surfaces in contact. The rolling seal also increases longitudinal compliance of a tunable suction or discharge valve of the invention, with the added benefit of increasing the rise and fall times of the closing energy impulse (thus narrowing the associated vibration spectrum).

Further regarding the term "correspondingly greater curvature" as used herein, note that the curvatures of the schematically illustrated longitudinal section edges (i.e., 26 and 28) and the surfaces of which they are a part (i.e., valve seat interface 22 and mating surface 24 respectively) are chosen so that the degree of longitudinal curvature of valve seat interface 22 (including edge 26) exceeds that of (i.e., has correspondingly greater curvature than) mating surface 24 (including edge 28) at any point of rolling contact. Hence, rolling contact between valve seat interface 22 and mating surface 24 is always along a substantially circular line, the plane of which is transverse to the (substantially coaxial) longitudinal axes of valve body 10 and valve seat 20.

Note that although valve seat interface 22 and mating surface 24 are schematically illustrated as curved, they may be frusto-conical in certain embodiments described herein.

Note also that in general, a tunable (suction or discharge) valve of the invention comprises a combination of a tunable valve assembly 99 (see, e.g., FIG. 1) and a valve seat 20 (see, e.g., FIG. 7). Referring more specifically to FIG. 6, tunable suction valve 95 is distinguished from tunable discharge valve 97 by one or more factors, including each measured resonant frequency to which each tunable valve is tuned so as to optimize the overall effectiveness of valve-generated vibration attenuation in the associated pump housing 78.

What is claimed is:
1. A tunable suction valve comprising a tunable valve assembly and a valve seat, said tunable valve assembly being substantially symmetrical about a longitudinal axis and comprising a valve body, guide means, and a plurality of viscoelastic elements;

wherein said valve body comprises a peripheral valve seat interface and a peripheral groove spaced apart from a central annular reservoir;

wherein said plurality of viscoelastic elements comprises a reservoir element at least partially constrained as it is disposed in said annular reservoir, and a groove element disposed in said peripheral groove, said viscoelastic groove element comprising a circumferential tubular area;

wherein said at least partially constrained viscoelastic reservoir element has at least a first predetermined assembly resonant frequency substantially replicating a measured resonant frequency;

wherein said circumferential tubular area comprises at least one shear thickening material having at least a second predetermined assembly resonant frequency similar to said first predetermined assembly resonant frequency;

wherein said valve seat comprises a curved mating surface and said valve body peripheral valve seat interface has a correspondingly greater curvature; and wherein the correspondingly greater curvature provides a rolling contact seal which forces the peripheral valve seat interface to rotate slightly during seating and which causes a concave flexure of the valve body.

2. The tunable suction valve of claim 1 wherein said viscoelastic reservoir element has at least one unconstrained area.

3. The tunable suction valve of claim 2 wherein at least one said viscoelastic reservoir element unconstrained area is open to pumped fluid pressure.

4. The tunable suction valve of claim 1 wherein said viscoelastic reservoir element is additionally partially constrained by an adjustable preload flange coupled to said valve body.

5. A pump fluid end subassembly comprising the tunable suction valve of claim 1.

6. A tunable suction valve comprising a tunable valve assembly and a valve seat, said tunable valve assembly being substantially symmetrical about a longitudinal axis and comprising a valve body and a plurality of viscoelastic elements;

wherein said valve body has a peripheral valve seat interface and a peripheral groove spaced apart from a central longitudinal guide stem by an annular reservoir, said peripheral groove being responsive to longitudinal compressive force on said tunable suction valve;

wherein said plurality of viscoelastic elements comprises viscoelastic groove and reservoir elements which lie in said peripheral groove and said annular reservoir respectively;

wherein said assembly further comprises an adjustable preload flange coupled to said guide stem, said flange imposing an adjustable annular constraint on said viscoelastic reservoir element for achieving at least a first predetermined assembly resonant frequency substantially replicating a measured resonant frequency;

wherein said assembly additionally comprises at least one circumferential tubular area in said viscoelastic groove element, each said tubular area being substantially filled with at least one shear thickening material having at least a second predetermined assembly resonant frequency similar to said first predetermined assembly resonant frequency;

wherein said valve seat comprises a curved mating surface and said valve body peripheral valve seat interface has a correspondingly greater curvature; and wherein the correspondingly greater curvature provides a rolling contact seal which forces the peripheral valve seat interface to rotate slightly during seating and which causes a concave flexure of the valve body.

7. The tunable suction valve of claim 6 wherein said viscoelastic reservoir element adjustable annular constraint is imposed central to an annular unconstrained area.

8. The tunable suction valve of claim 7 wherein said viscoelastic reservoir element annular unconstrained area is open to pumped fluid pressure.

9. A pump fluid end subassembly comprising the tunable suction valve of claim 6.

10. A pump fluid end comprising a plurality of the pump fluid end subassemblies of claim 9.

11. A tunable suction valve comprising a tunable valve assembly and a valve seat, said tunable valve assembly comprising a valve body substantially symmetrical about a longitudinal axis, an adjustable preload flange centrally coupled to said valve body, guide means, and a plurality of viscoelastic elements;

wherein said valve body comprises a peripheral valve seat interface and a peripheral groove coupled to a central reservoir, said peripheral groove being responsive to longitudinal compressive force on said tunable valve assembly;

wherein said plurality of viscoelastic elements comprises a groove element disposed in said peripheral groove and a reservoir element disposed in said central reservoir, said viscoelastic reservoir element comprising at least one area constrained by said adjustable preload flange to achieve at least a first predetermined assembly resonant frequency substantially replicating a measured resonant frequency;

wherein said tunable valve assembly additionally comprises at least one circumferential tubular area in said viscoelastic groove element, each said tubular area being substantially filled with at least one shear-thickening material having at least a second predetermined assembly resonant frequency similar to said first predetermined assembly resonant frequency;

wherein said valve seat comprises a curved mating surface and said valve body peripheral valve seat interface has a correspondingly greater curvature; and wherein the correspondingly greater curvature provides a rolling contact seal which forces the peripheral valve seat interface to rotate slightly during seating and which causes a concave flexure of the valve body.

12. The tunable suction valve of claim 11 wherein said reservoir element additionally comprises at least one area unconstrained by said adjustable preload flange.

13. A pump fluid end subassembly comprising the tunable suction valve of claim 11.

14. A pump fluid end comprising a plurality of the pump fluid end subassemblies of claim 13.

* * * * *